US010799824B2

(12) United States Patent
Guth et al.

(10) Patent No.: US 10,799,824 B2
(45) Date of Patent: *Oct. 13, 2020

(54) PORTABLE SYSTEM AND METHODOLOGY THAT FACILITATES DUST COLLECTION WITHIN A SILO APPARATUS

(71) Applicant: JPL Global, LLC, Moreno Valley, CA (US)

(72) Inventors: Paul W. Guth, Menifee, CA (US); Joel Guth, Menifee, CA (US)

(73) Assignee: JPL Global, LLC, Irvine, CA (US)

( * ) Notice: Subject to any disclaimer, the term of this patent is extended or adjusted under 35 U.S.C. 154(b) by 149 days.

This patent is subject to a terminal disclaimer.

(21) Appl. No.: 15/644,660

(22) Filed: Jul. 7, 2017

(65) Prior Publication Data

US 2017/0304761 A1    Oct. 26, 2017

Related U.S. Application Data

(63) Continuation of application No. 14/836,934, filed on Aug. 26, 2015, now Pat. No. 10,016,712.
(Continued)

(51) Int. Cl.
*B01D 50/00* (2006.01)
*B01D 46/52* (2006.01)
(Continued)

(52) U.S. Cl.
CPC ......... *B01D 46/0041* (2013.01); *B01D 45/16* (2013.01); *B01D 46/521* (2013.01); *B01D 50/002* (2013.01)

(58) Field of Classification Search
CPC ........ B01D 50/00; B01D 46/52; B01D 45/16; B01D 46/00; B01D 46/0041;
(Continued)

(56) References Cited

U.S. PATENT DOCUMENTS 1,339,338 A * 5/1920 Hickok ............... A01D 46/243
                                                    182/49
3,707,998 A    1/1973 Dalrymple
(Continued)

FOREIGN PATENT DOCUMENTS

DE    004240014 A1    6/1994
EP    000658502 A1    6/1995
(Continued)

OTHER PUBLICATIONS

PCT/US16/31333. International Search Report and Written Opinion (dated Oct. 20, 2016), 6 pages.

*Primary Examiner* — Minh Chau T Pham
(74) *Attorney, Agent, or Firm* — Daniel Castro; Loza & Loza LLP

(57) ABSTRACT

Aspects to facilitate dust collection are disclosed. In one aspect, a chute provides a dust seal between a bulk bag of material and a silo loading hatch. Here, the dust seal comprises a first seal between a first end of the chute and the bulk bag, and a second seal between a second end of the chute and the silo loading hatch. In another aspect, a collapsible chute is extended between a silo loading hatch and a discharge chute of a bulk bag such that the collapsible chute forms a dust seal between the silo loading hatch and the bulk bag. Contents of the bulk bag are released via the discharge chute so that the contents of the bulk bag flow into the silo loading hatch. For this embodiment, the dust seal prevents airborne dust associated with the flow from escaping into an exterior portion of the collapsible chute.

19 Claims, 10 Drawing Sheets

Related U.S. Application Data

(60) Provisional application No. 62/158,525, filed on May 7, 2015.

(51) Int. Cl.
| | | |
|---|---|---|
| *B01D 45/16* | (2006.01) | |
| *B01D 46/00* | (2006.01) | |
| *B65G 53/24* | (2006.01) | |
| *B65G 65/46* | (2006.01) | |
| *B65G 53/14* | (2006.01) | |
| *B65G 65/48* | (2006.01) | |

(58) Field of Classification Search
CPC .... B01D 50/002; B01D 45/521; B65G 53/24; B65G 65/46; B65G 53/14; B65G 65/48
USPC ...... 55/300, 304, 337, 345, 346, 428, 385.1, 55/DIG. 18; 95/268; 451/87, 88, 453, 451/456
See application file for complete search history.

(56) References Cited

U.S. PATENT DOCUMENTS

| | | | | |
|---|---|---|---|---|
| 3,799,221 | A | | 5/1974 | Vincent |
| 3,881,610 | A | | 5/1975 | Hessling |
| 4,140,217 | A | * | 2/1979 | Dell ................ B65G 69/181 |
| | | | | 198/636 |
| 4,491,253 | A | * | 1/1985 | Coleman ............ B65D 90/587 |
| | | | | 105/282.1 |
| 4,792,234 | A | | 12/1988 | Doherty |
| 4,810,156 | A | * | 3/1989 | Pendleton .......... B65B 69/0091 |
| | | | | 222/203 |
| 5,190,132 | A | * | 3/1993 | Stanelle ............. B65G 69/182 |
| | | | | 193/30 |
| 5,357,877 | A | * | 10/1994 | Nuesmeyer ......... F23B 50/12 |
| | | | | 110/108 |
| 6,491,070 | B1 | | 12/2002 | Espina Frutos |
| 6,955,195 | B1 | * | 10/2005 | Marceau ................. B65B 1/06 |
| | | | | 141/10 |
| 7,282,074 | B1 | * | 10/2007 | Witter .................. B01D 45/12 |
| | | | | 451/453 |
| 7,427,182 | B2 | | 9/2008 | Galijan |
| 10,016,712 | B2 | * | 7/2018 | Guth ................. B01D 46/0041 |
| 2002/0073503 | A1 | | 6/2002 | Wisser |
| 2005/0217976 | A1 | * | 10/2005 | Hall ..................... B65G 11/206 |
| | | | | 198/525 |
| 2005/0263051 | A1 | * | 12/2005 | Harnetiaux ........... A01C 7/081 |
| | | | | 111/174 |
| 2006/0151280 | A1 | * | 7/2006 | Pircon ................. B65G 11/126 |
| | | | | 193/4 |
| 2006/0207230 | A1 | * | 9/2006 | DeMarco .............. B01D 45/08 |
| | | | | 55/319 |
| 2015/0020661 | A1 | | 1/2015 | Fairweather et al. |
| 2018/0022552 | A1 | * | 1/2018 | Hogan ................ B65G 11/023 |
| | | | | 193/25 R |
| 2019/0276225 | A1 | * | 9/2019 | Warren ................. B65D 90/12 |

FOREIGN PATENT DOCUMENTS

| | | |
|---|---|---|
| ES | 2316225 A1 | 2/2010 |
| JP | 62254890 A | 11/1987 |
| RU | 18622 | 7/2001 |
| RU | 2423904 C1 | 7/2011 |
| RU | 2429059 C1 | 9/2011 |

* cited by examiner

PORTABLE SYSTEM AND METHODOLOGY THAT FACILITATES DUST COLLECTION WITHIN A SILO APPARATUS

CROSS-REFERENCE TO RELATED APPLICATIONS

This application is a continuation of U.S. patent application Ser. No. 14/836,934, filed Aug. 26, 2015, now U.S. Pat. No. 10,016,712, entitled "PORTABLE SYSTEM AND METHODOLOGY THAT FACILITATES DUST COLLECTION WITHIN A SILO APPARATUS," which claims priority to and the benefit of U.S. Provisional Patent Application Ser. No. 62/158,525, filed May 7, 2015, which is entitled "PORTABLE SYSTEM AND METHODOLOGY THAT FACILITATES DUST COLLECTION WITHIN A SILO APPARATUS". Accordingly, the entire contents of each of the aforementioned patent applications are hereby expressly incorporated by reference.

TECHNICAL FIELD

The subject disclosure generally relates to dust collection, and more specifically to a portable system and methodology that facilitates dust collection.

BACKGROUND

In order to produce dry cement-based products on site, contractors sometimes utilize a portable silo system, which reduces the cost of labor and the amount of waste that is common with conventional batching methods. The use of a portable silo system typically requires emptying a heavy-duty bulk bag of mixing material into a top portion of a funnel shaped silo, wherein the mixing material is subsequently emptied from the silo into a mixer below, as desired. During these two processes, however, much of the mixing material escapes into the surrounding environment in the form of dust, which could be harmful to workers.

Accordingly, a dust collection mechanism which prevents such dust from escaping during loading of a silo and/or mixer is desirable. To this end, it should be noted that the above-described deficiencies are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In accordance with one or more embodiments and corresponding disclosure, various non-limiting aspects are described in connection with a portable dust collection system. In one such aspect, an apparatus to facilitate dust collection is disclosed, which includes a chute configured to provide a dust seal between a bulk bag of material and a loading hatch of a silo. Within such embodiment, the dust seal comprises a first seal between a first end of the chute and a bottom portion of the bulk bag, and further comprises a second seal between a second end of the chute and a top portion of the loading hatch.

In another aspect, a method to facilitate dust collection is disclosed, which includes configuring a chute to provide a dust seal between a bulk bag of material and a loading hatch of a silo. For this embodiment, the configuring includes forming a first seal between a first end of the chute and a bottom portion of the bulk bag, and further includes forming a second seal between a second end of the chute and a top portion of the loading hatch.

In a further aspect, another method to facilitate dust collection is disclosed, which includes extending a collapsible chute between a silo loading hatch and a discharge chute of a bulk bag. Within such embodiment, the extending forms a dust seal between the silo loading hatch and the bulk bag. The method further includes releasing contents of the bulk bag via the discharge chute such that the contents of the bulk bag flow into the silo loading hatch. For this embodiment, the dust seal prevents airborne dust associated with the flow from escaping into an exterior portion of the collapsible chute.

Other embodiments and various non-limiting examples, scenarios and implementations are described in more detail below.

BRIEF DESCRIPTION OF THE DRAWINGS

Various non-limiting embodiments are further described with reference to the accompanying drawings in which.

DETAILED DESCRIPTION

Overview

The various embodiments disclosed herein are directed towards preventing mixing material from escaping as dust within the context of portable silo systems. Here, it should be appreciated that the portable dust collection systems described herein are defined as systems capable of being readily installed onto a material silo by one person in a relatively short period of time (e.g., less than one hour). Portable systems as defined herein are therefore systems that are significantly smaller and lighter than conventional systems, and can thus be easily carried or moved.

As previously stated, dust primarily escapes from silo systems either when the mixing material is loaded into a silo, or when the mixing material is emptied into a mixer. Accordingly, in a first aspect, an apparatus configured to facilitate dust collection when loading mixing material into a silo is disclosed. Within such embodiment, the apparatus is configured as a portable vacuum, filtration, and dust collection unit, wherein a dust seal is formed between a bulk bag of material and a loading hatch of the silo. During operation, it is contemplated that a vacuum source provides a negative pressure to an area proximate to the loading hatch, wherein airborne dust within the silo is removed by the negative pressure and collected into a filter component.

In another aspect, an apparatus configured to facilitate dust collection when emptying mixing material into a mixer is disclosed. Within such embodiment, the apparatus is configured as a portable vacuum, filtration, and dust collection unit, wherein a dust seal is formed between a silo discharge gate and the mixer. During operation, it is contemplated that a vacuum source provides a negative pressure to an area proximate to the silo discharge gate, wherein airborne dust within the mixer is removed by the negative pressure and collected into a filter component.

In a further aspect, rather than having separate dust collection systems, a single design is contemplated which can facilitate dust collection on multiple dust generating devices. Within such embodiment, the apparatus is configured as a portable vacuum, filtration, and dust collection unit, wherein a dust seal is formed between the apparatus and a plurality of dust generating devices (e.g., a silo, a mixer, and/or a power saw). Here, the apparatus further comprises a flow selector valve configured to select at least one desired air flow corresponding to an air flow between the apparatus and at least one selected dust source. During operation, it is contemplated that a vacuum source provides a negative pressure within the selected dust source(s), wherein airborne dust within the selected dust source(s) is removed by the negative pressure and collected into a filter component.

Silo Dust Collection Embodiment

Figure 1:
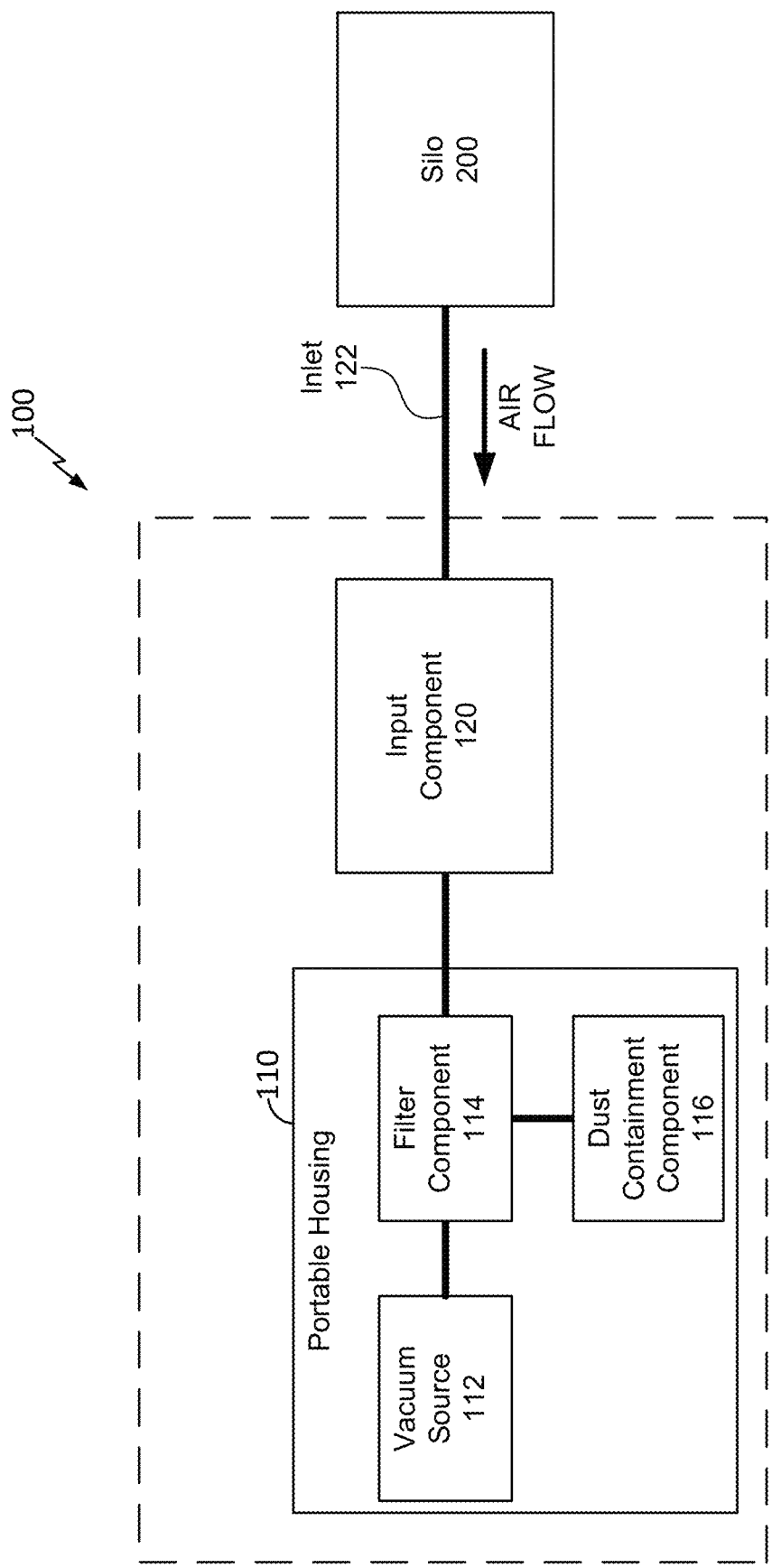
FIG. 1 is a block diagram of an exemplary apparatus that facilitates removing airborne dust from a silo in accordance with an aspect of the subject specification.
Figure 2:
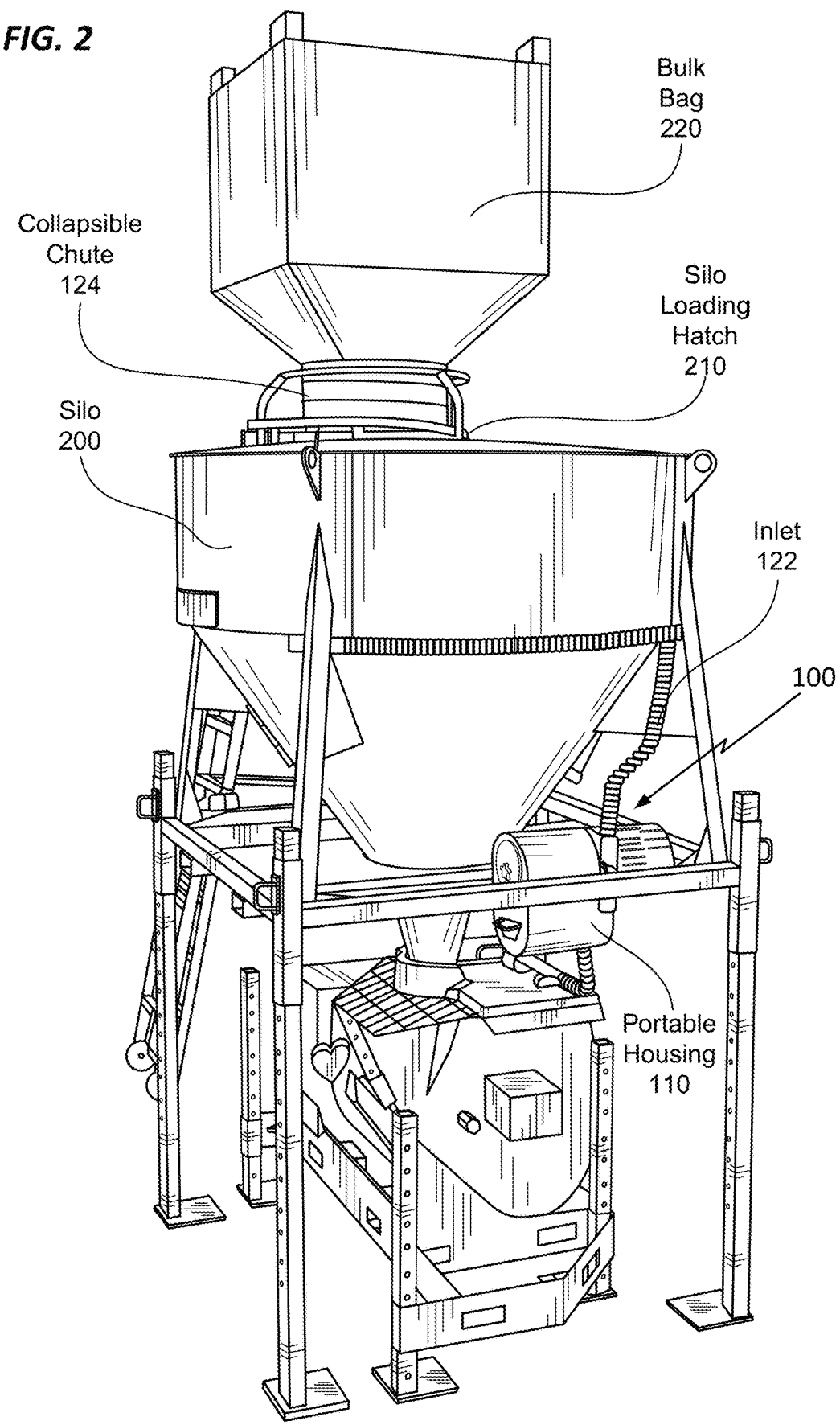
FIG. 2 is a schematic of an exemplary apparatus that facilitates removing airborne dust from a silo in accordance with an aspect of the subject specification.

Referring first to FIGS. 1 and 2, a block diagram and schematic are respectively provided of an exemplary apparatus that facilitates removing airborne dust from a silo in accordance with an aspect of the disclosure. As illustrated, apparatus 100 comprises a portable housing 110 coupled to an input component 120, wherein the portable housing 110 further comprises a vacuum source 112, a filter component 114, and a dust containment component 116. For this embodiment, the input component 120 also comprises at least one inlet 122, as shown, wherein the input component 120 is configured as a conduit between the portable housing 110 and a silo 200. In a particular aspect, the vacuum source 112 is configured to provide a negative pressure within an interior portion of the silo 200 by creating an air flow from the interior portion of the silo 200 to the portable housing 110 via the input component 120, wherein the filter component 114 is coupled to the input component 120 and configured to collect airborne dust removed from the silo 200 by the negative pressure.

Figure 3:
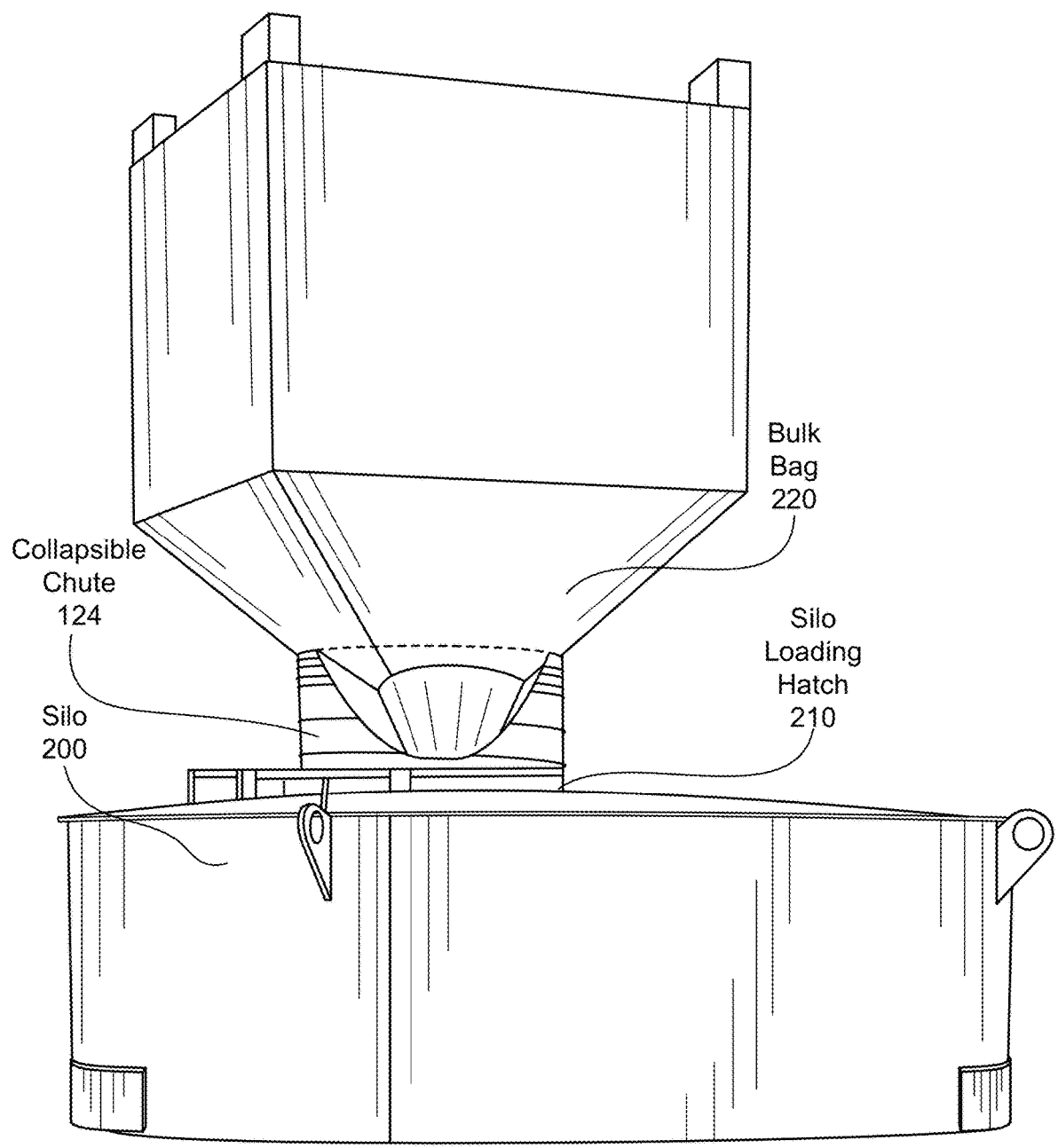
FIG. 3 is a schematic illustrating a view within an exemplary collapsible chute in accordance with an aspect of the subject specification.

An exemplary operation of apparatus 100 is now described in accordance with an aspect of the disclosure. With the vacuum source 112 powered on, a vacuum or negative pressure is created inside the silo 200 and in the vicinity of the collapsible chute 124. In a particular aspect, the collapsible chute 124 is made from flexible material (e.g., canvas, plastic, rubber, rice paper, etc.) and includes a built-in spring tension to provide vertical pressure against the top of the silo 200 and a bulk bag 220 of material (e.g., cement-based material) so as to create a relatively sealed area that can contain local dust (e.g., silica, cement mix, wood dust, lint, and/or any other type of airborne dust, including any of various types of dust deemed harmful by regulatory bodies such as the Occupational Safety and Health Administration (OSHA)) and maintain a negative pressure or vacuum within an interior portion of the silo 200 in an area proximate to the silo loading hatch 210 (i.e., to ensure that the seal created by the collapsible chute 124 prevents airborne dust levels outside of the collapsible chute 124 from exceeding acceptable OSHA standards, for example). Next, the bulk bag 220 is lifted into position above the silo loading hatch 210 and lowered down on to the collapsible chute 124 creating a dust seal. In FIG. 3, for instance, a schematic illustrating a view within an exemplary collapsible chute is provided, which shows the dust seal formed by extending the collapsible chute 124 up from the silo loading hatch 210 to the discharge chute of the bulk bag 220.

After the dust seal is formed, the discharge chute of the bulk bag 220 is untied and released allowing the contents of the bulk bag 220 to flow into the silo 200. The resulting airborne dust inside the collapsible chute 124 and inside the silo 200 is evacuated via a vent hole of the silo 200 through the inlet 122 (e.g., a vacuum hose) and into the filter component 114. Within a particular embodiment, the filter component 114 comprises a multi-stage filtration system optimized to collect dust particles of un-hydrated cement and silica, wherein airborne dust drawn from the silo 200 via the inlet 122 travels through a first stage filtration system, then into a second stage filtration system, and subsequently trapped in the dust containment component 116. The clean filtered air then travels through a vacuum fan of the vacuum source 112 and out into the local atmosphere. Periodically, the dust containment component 116 may be emptied and disposed of appropriately. For example, depending on the type of material, the contents of the dust containment component 116 may be recovered and added directly to a mixer system.

With respect to the filter component 114, it should be appreciated that various configurations for filtering dust drawn from the silo are contemplated. For instance, the first stage filtration may be configured to filter the dust through a cyclonic separation process which eliminates larger dust particles and captures a majority of the dust prior to moving on to the second stage filtration system. The second stage filtration system may then, for example, utilize a cartridge or pleated media that can be cleaned and/or replaced periodically depending on the dust micron level of collection required. Each of the first and second stage filtration system may then be coupled to the dust containment component 116, wherein the dust containment component 116 may be a container secured with a vacuum tight fit during operation which may then be released and quickly removed for dust disposal.

Mixer Dust Collection Embodiment

Figure 4:
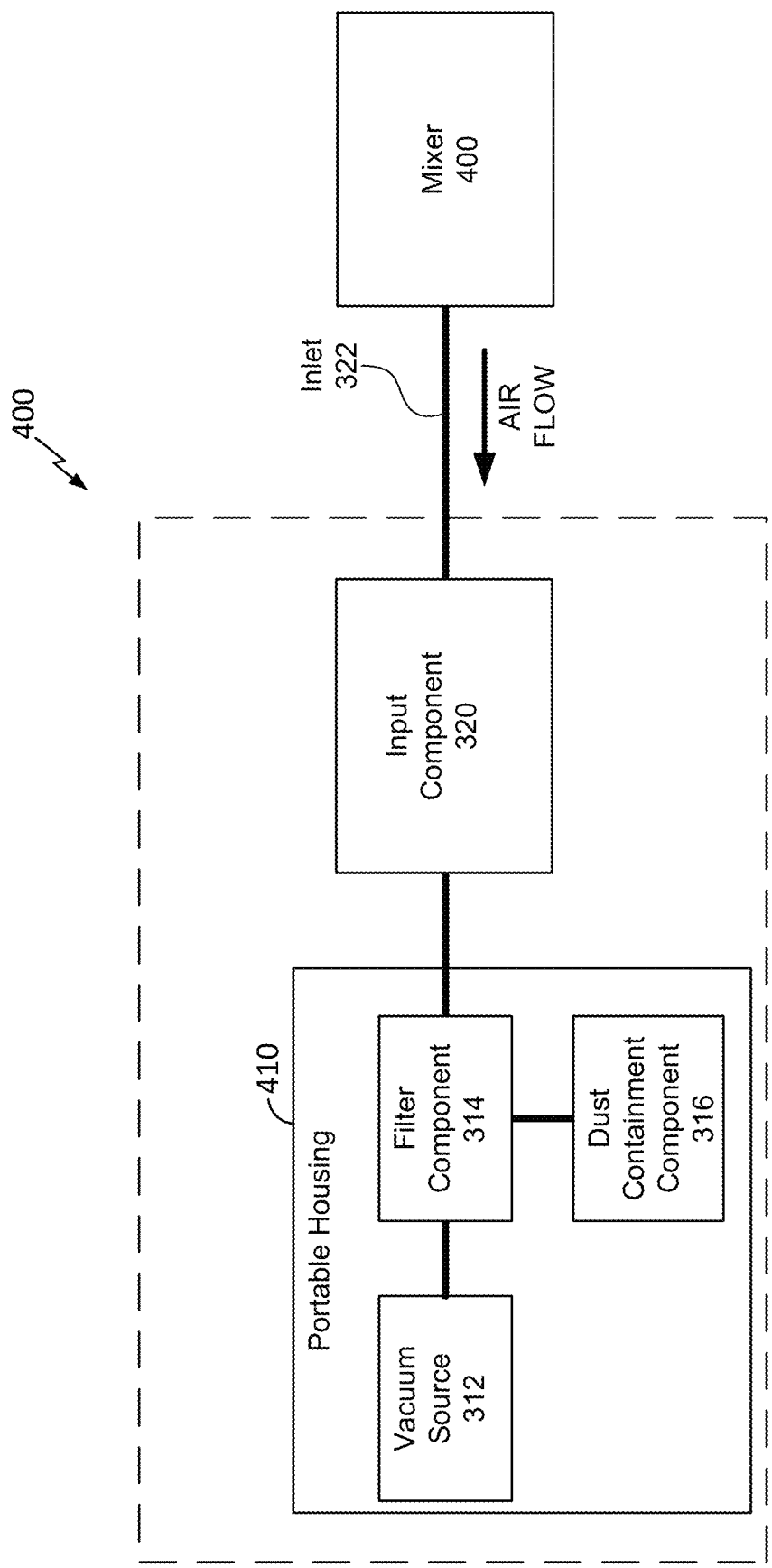
FIG. 4 is a block diagram of an exemplary apparatus that facilitates removing airborne dust from a mixer in accordance with an aspect of the subject specification.
Figure 5:
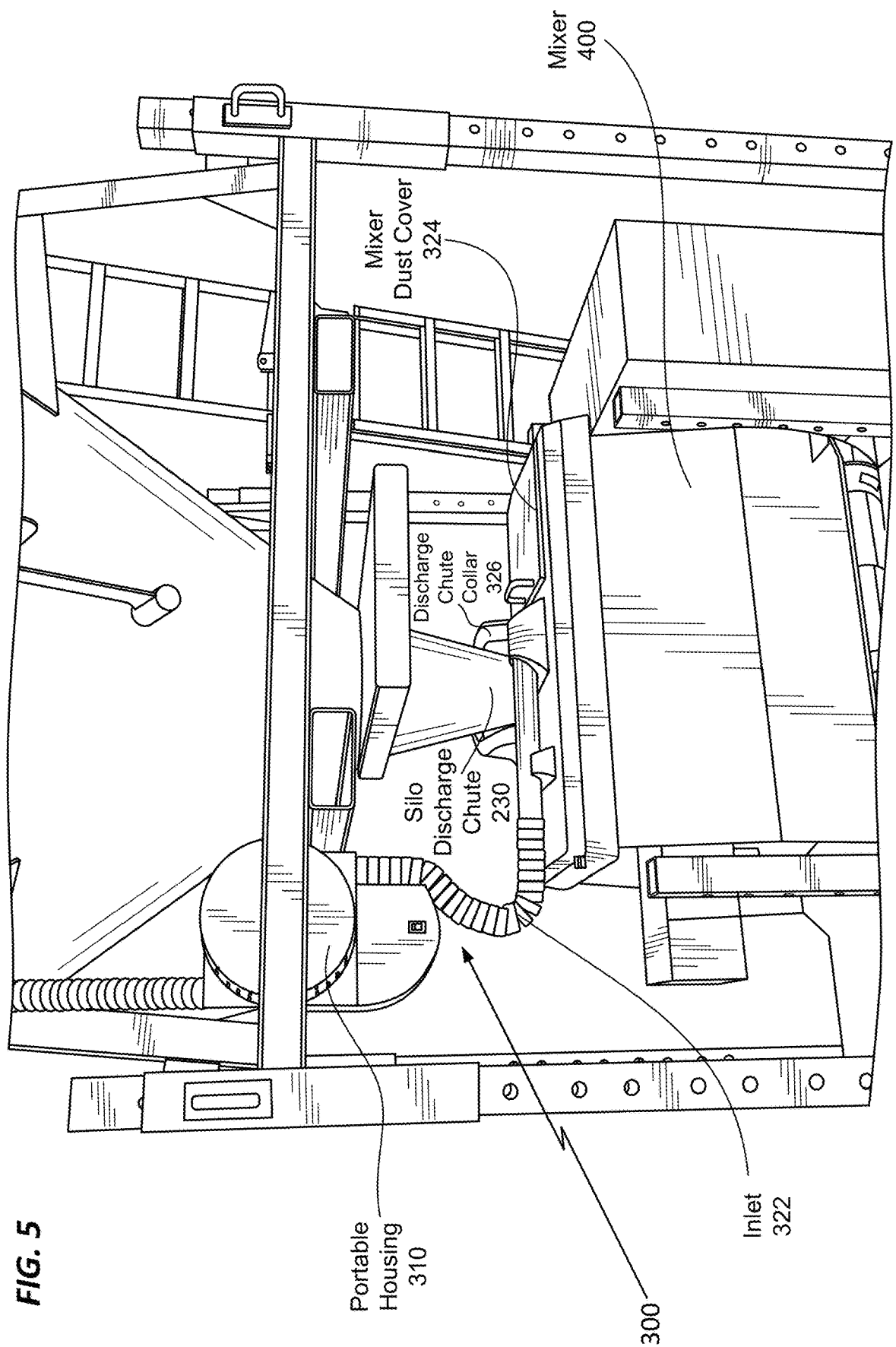
FIG. 5 is a schematic of a first view of an exemplary apparatus that facilitates removing airborne dust from a mixer in accordance with an aspect of the subject specification.
Figure 6:
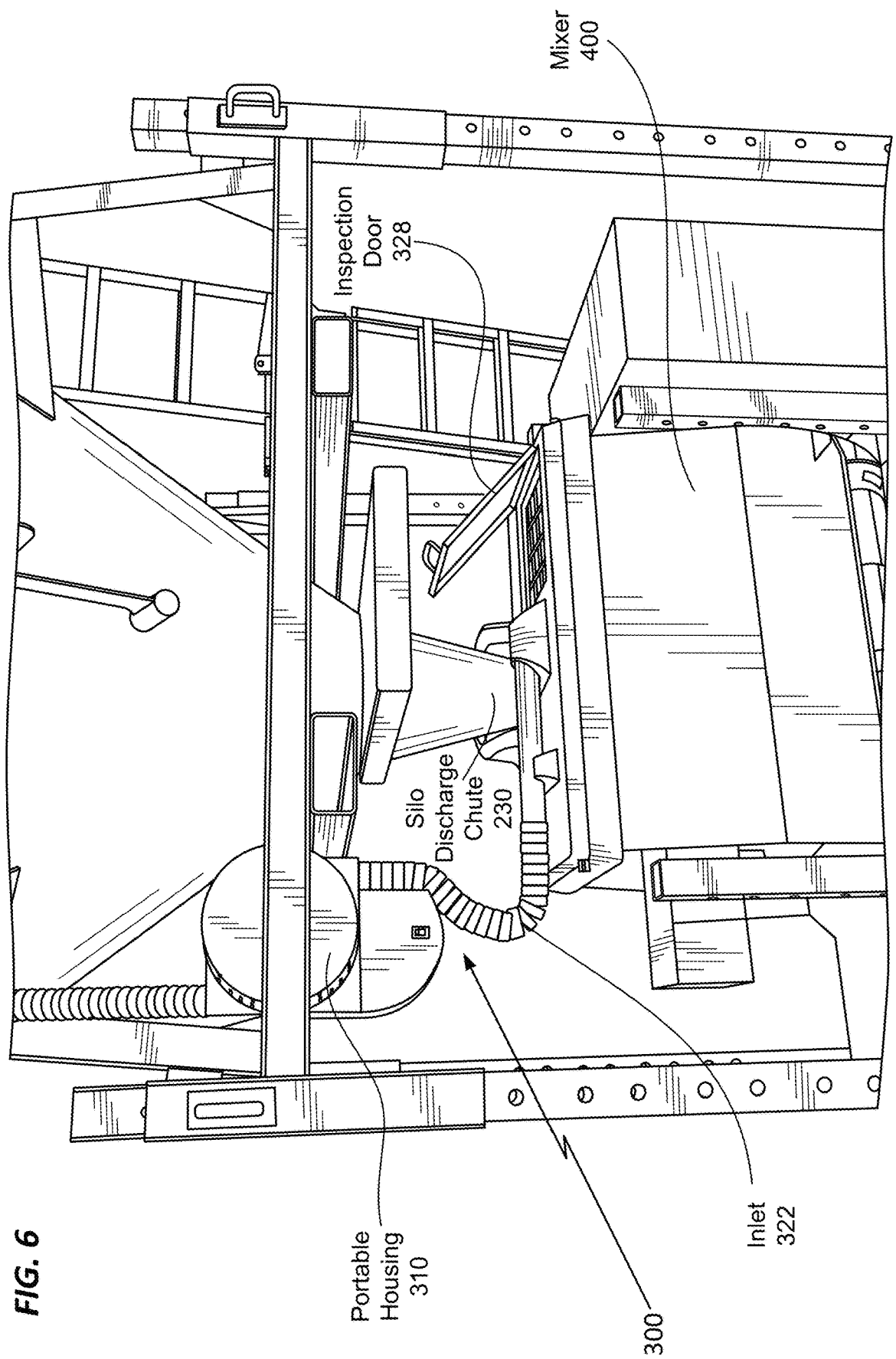
FIG. 6 is a schematic of a second view of an exemplary apparatus that facilitates removing airborne dust from a mixer in accordance with an aspect of the subject specification.

Referring next to FIG. 4, a block diagram is provided of an exemplary apparatus that facilitates removing airborne dust from a mixer in accordance with an aspect of the disclosure. Schematic illustrations of such an exemplary apparatus are also provided in FIGS. 5-8. As illustrated, apparatus 300 comprises a portable housing 310 coupled to an input component 320, wherein the portable housing 310 further comprises a vacuum source 312, a filter component 314, and a dust containment component 316. For this embodiment, the input component 320 also comprises at least one inlet 322, as shown, wherein the input component 320 is configured as a conduit between the portable housing 310 and a mixer 400. In a particular aspect, the vacuum source 312 is configured to provide a negative pressure within an interior portion of the mixer 400 by creating an air flow from the interior portion of the mixer 400 to the portable housing 310 via the input component 320, wherein the filter component 314 is coupled to the input component 320 and configured to collect airborne dust removed from the mixer 400 by the negative pressure. Here, in a particular embodiment, it should be appreciated that the mixer 400 is contemplated to be a portable mixer (e.g., a towable mixer used for mortar, grout, etc.).

Figure 7:
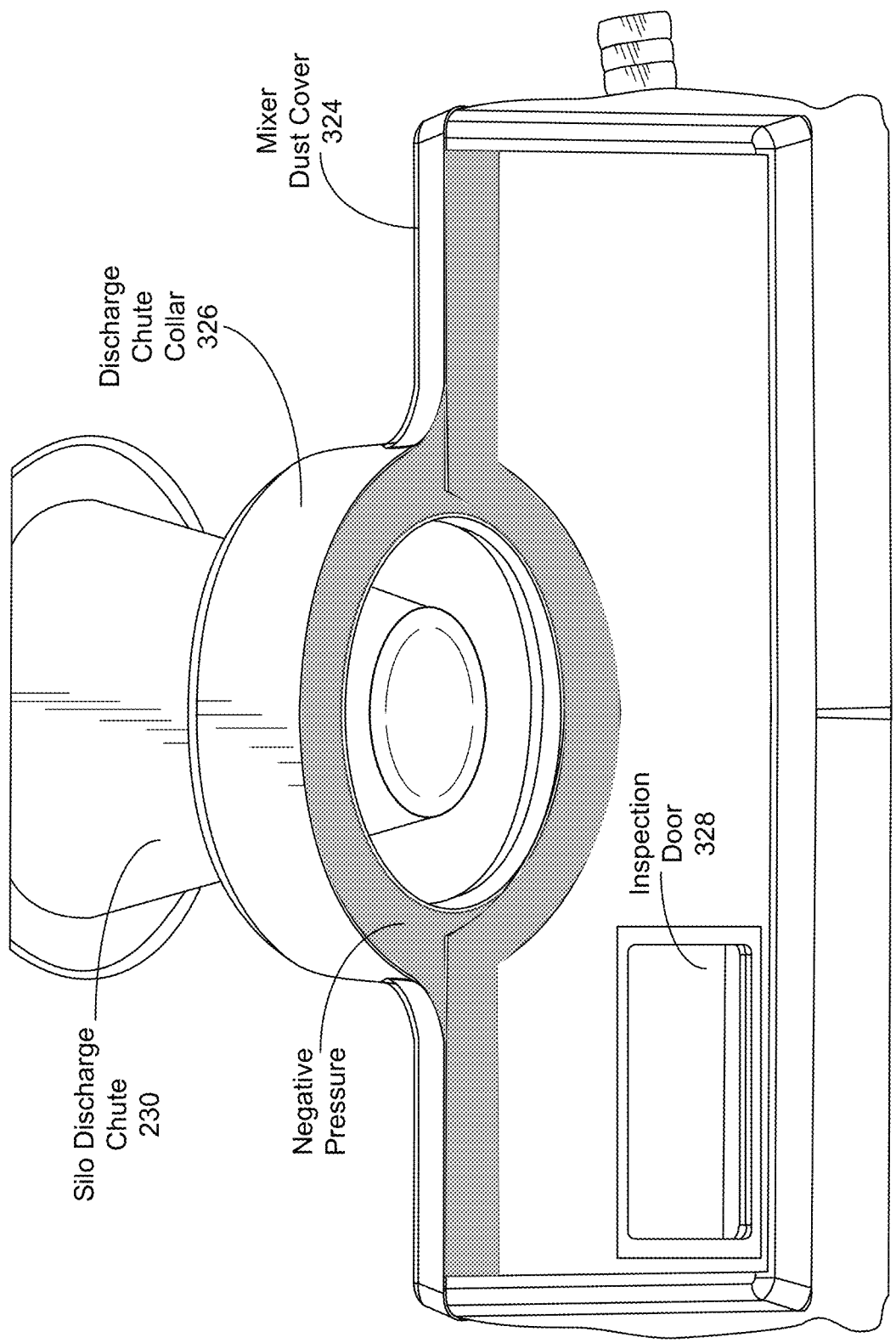
FIG. 7 is a schematic illustrating an exemplary area of negative pressure created by air flow in accordance with an aspect of the subject specification.

An exemplary operation of apparatus 300 is now described in accordance with an aspect of the disclosure. With the vacuum source 312 powered on, a vacuum or negative pressure is created inside the mixer 400 and in the vicinity of the mixer dust cover 324. In a particular embodiment, as illustrated in FIG. 7, this negative pressure is created within an interior portion of the mixer 400 in an area proximate to the discharge chute collar 326. Once the negative pressure has been created, the silo discharge chute 230 is then opened which releases material into the mixer 400. Here, the resulting airborne dust inside the mixer 400 is desirably contained and evacuated through a dust collection port on the mixer dust cover 324 through the inlet 322 (e.g., a vacuum hose) and into the filter component 314. It is contemplated that filter component 314 may be substantially similar to filter component 114, and may thus comprise a multi-stage filtration system optimized to collect dust particles of un-hydrated cement and silica, wherein airborne dust drawn from the mixer 400 via the inlet 322 travels through a first stage filtration system, then into a second stage filtration system, and subsequently trapped in the dust containment component 316. The clean filtered air then travels through a vacuum fan of the vacuum source 312 and out into the local atmosphere.

With respect to the mixer dust cover 324, it should be appreciated that various configurations are contemplated. For instance, the mixer dust cover 324 may comprise a dust collection port connected via inlet 322 to the vacuum source 312. In a particular embodiment, the mixer dust cover 324 is designed to cover a majority of the mixer 400 opening. Within such embodiment, a substantially enclosed area is thus formed within a top portion of the mixer 400 when the mixer dust cover 324 is closed. When negative pressure is applied to this area via the vacuum source 312, a significant flow of air towards the filter component 314 can therefore be created to capture any airborne dust inside the mixer 400. As illustrated, the mixer dust cover 324 may also include an inspection door 328 so that the mixer operator can inspect a mixed batch for hydration and plasticity.

Figure 8:
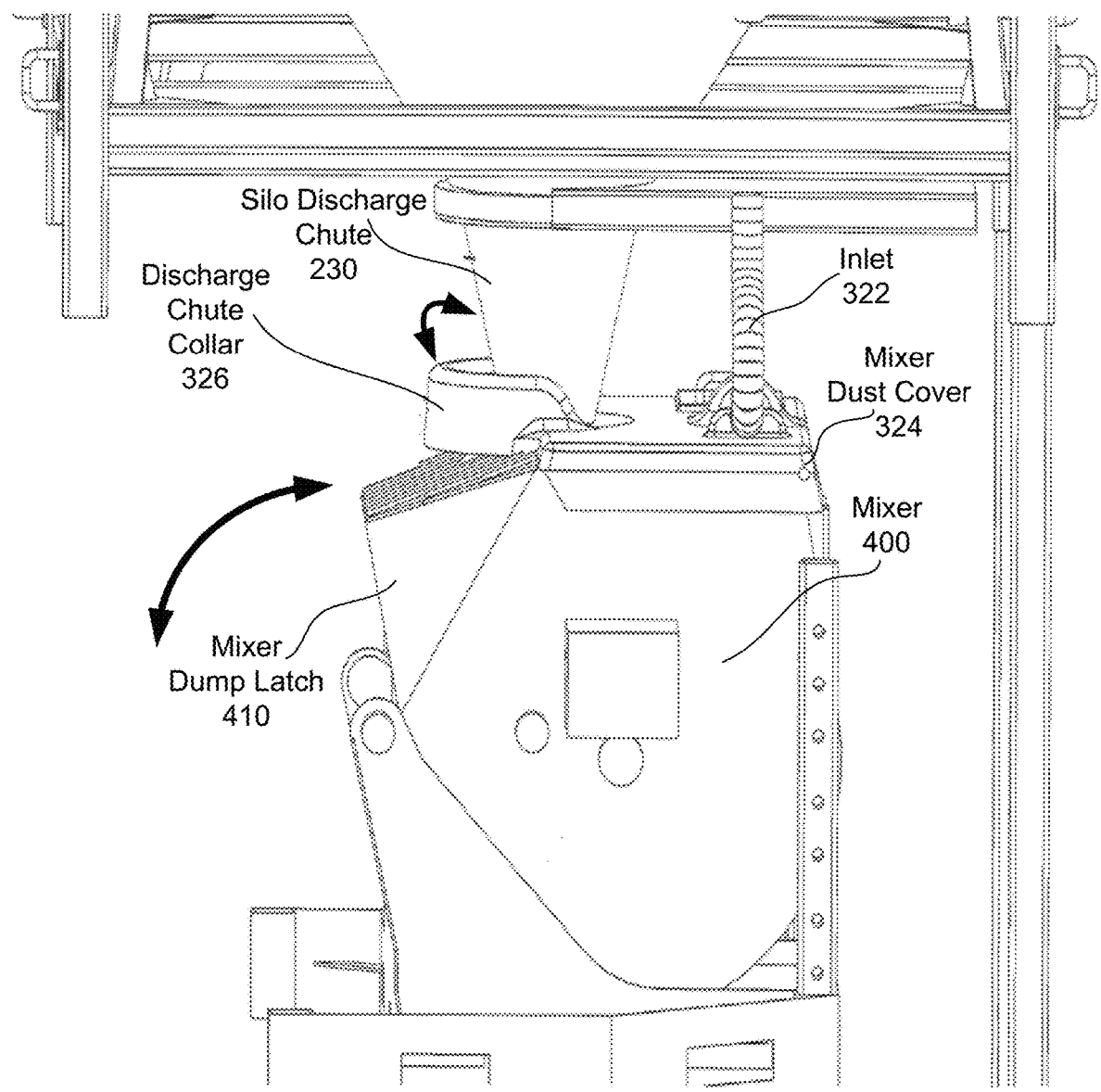
FIG. 8 is a schematic of a side view of an exemplary apparatus that facilitates removing airborne dust from a mixer in accordance with an aspect of the subject specification.

As illustrated in FIG. 8, the mixer dust cover 324 may also integrate a discharge chute collar 326 to receive the silo discharge chute 230 which ensures proper positioning of the mixer 400 relative to the silo 300 for optimal dust capture. The discharge chute collar 326 may also be configured to lock a mixer dump latch 410 in a closed position during operation. For instance, the discharge chute collar 326 may be configured to swivel upwards towards the silo discharge chute 230, as shown, so as to unlock the mixer dump latch 410, which may then be swiveled downward to unload contents within.

Multiple Device Dust Collection Embodiment

Figure 9:
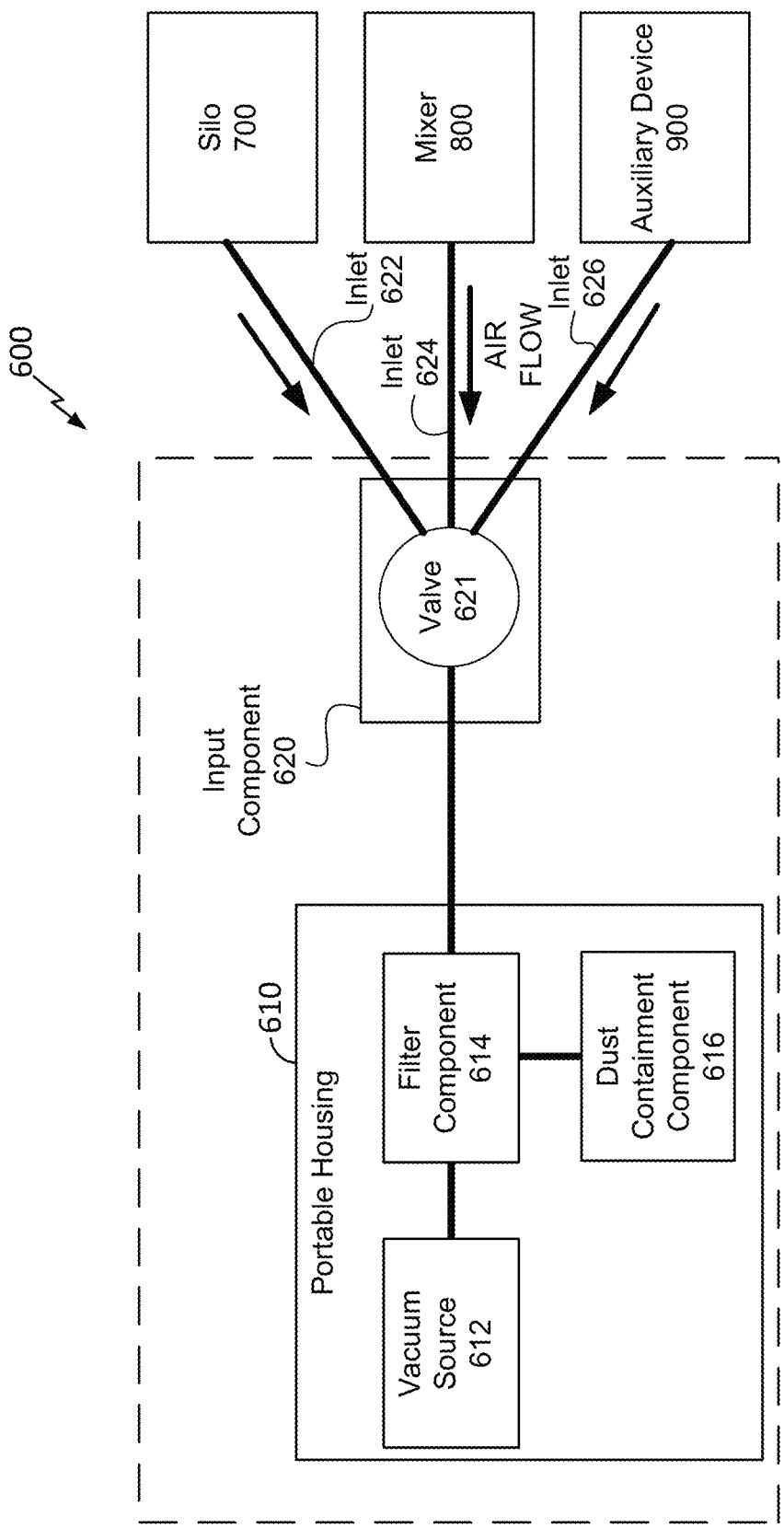
FIG. 9 is a block diagram of an exemplary apparatus that facilitates removing airborne dust from a plurality of dust-generating devices in accordance with an aspect of the subject specification.
Figure 10:
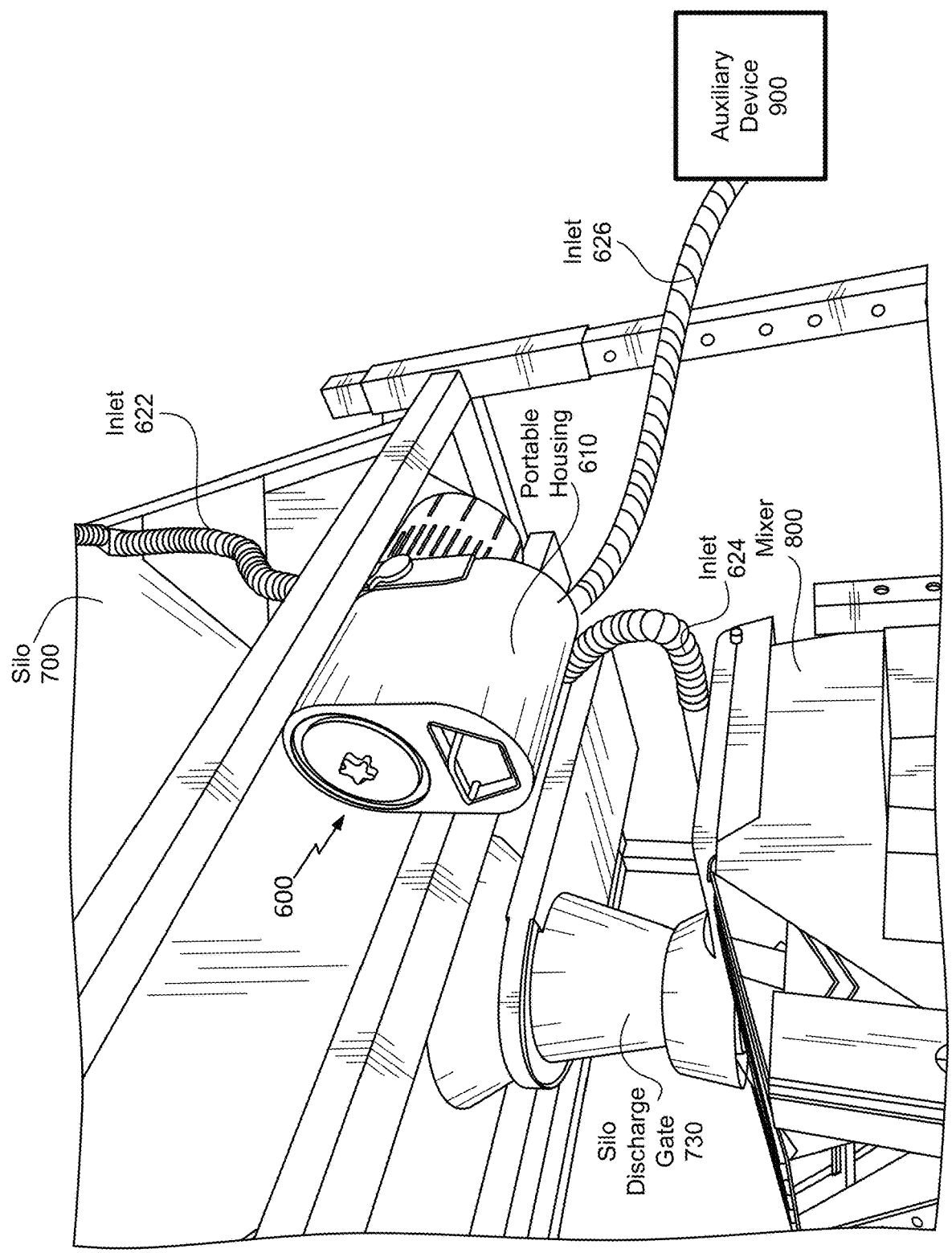
FIG. 10 is a schematic of an exemplary apparatus that facilitates removing airborne dust from a plurality of dust-generating devices in accordance with an aspect of the subject specification.

Referring next to FIGS. 9 and 10, a block diagram and schematic are respectively provided of an exemplary apparatus that facilitates removing airborne dust from a plurality of dust-generating devices in accordance with an aspect of the disclosure. As illustrated, apparatus 600 comprises a portable housing 610 coupled to an input component 620, wherein the portable housing 610 further comprises a vacuum source 612, a filter component 614, and a dust containment component 616. For this embodiment, the input component 620 comprises a flow selector valve 621 and a plurality of inlets 622, 624, and 626, respectively coupled to a plurality of dust sources (i.e., silo 700, mixer 800, and auxiliary device 900), as shown, wherein the input component 620 is configured as a conduit between the portable housing 610 and each of the plurality of dust sources. The flow selector valve 621 is then configured to select at least one desired air flow corresponding to an air flow between the portable housing 610 and at least one selected dust source 700, 800, and/or 900. In a particular aspect, the vacuum source 612 is configured to provide a negative pressure within an interior portion of the at least one selected dust source 700, 800, and/or 900 by creating the at least one desired air flow from the interior portion of the at least one selected dust source 700, 800, and/or 900 to the portable housing 610 via the input component 620, wherein the filter component 614 is coupled to the input component 620 and configured to collect airborne dust removed from the at least one selected dust source 700, 800, and/or 900 by the negative pressure.

An exemplary operation of apparatus 600 is now described in accordance with an aspect of the disclosure. If dust collection is desired for loading contents of a bulk bag into a silo (i.e., where the selected dust source is silo 700), the vacuum source 612 is powered on while the flow selector valve 621 is switched to the corresponding setting for loading a silo (e.g., a "zone 1" setting may correspond to a silo 700). Thereafter, the operation of apparatus 600 is substantially similar to the operation of apparatus 100, wherein the components of apparatus 100 and apparatus 600 are also substantially similar. If dust collection is desired for loading contents of a silo into a mixer (i.e., where the selected dust source is mixer 800), the vacuum source 612 is powered on while the flow selector valve 621 is switched to the corresponding setting for loading a mixer (e.g., a "zone 2" setting may correspond to a mixer 800). Thereafter, the operation of apparatus 600 is substantially similar to the operation of apparatus 300, wherein the components of apparatus 300 and apparatus 600 are also substantially similar.

As illustrated, apparatus 600 may also be configured to facilitate dust collection within an auxiliary device 900. To this end, it should be appreciated that such auxiliary device 900 may be any of various devices in which dust collection may be desired (e.g., the chop saw disclosed in U.S. Pat. No. 8,869,786, which is hereby incorporated by reference in its entirety). Namely, it is contemplated that the inlet 626 may be used to couple apparatus 600 to any auxiliary device 900 in which a vacuum or negative pressure is desired for dust collection. If dust collection is indeed desired for an auxiliary device 900, the vacuum source 612 is powered on while the flow selector valve 621 is switched to the corresponding setting for an auxiliary device 900 (e.g., a "zone 3" setting may correspond to an auxiliary device 900). Thereafter, the operation of apparatus 600 is substantially similar to the operation of apparatuses 100 and 300, wherein the components of apparatuses 100 and 300 are also substantially similar to apparatus 600.

In a further aspect, it should be appreciated that although FIGS. 9 and 10 only show a single silo 700, mixer 800, and auxiliary device 900, apparatus 600 may be configured to facilitate dust collection for any number of silos, mixers, and/or auxiliary devices. Furthermore, although operation of apparatus 600 has been described within the context of operating one of silo 700, mixer 800, or auxiliary device 900 at a time, apparatus 600 may also be configured to simultaneously operate any combination of silo 700, mixer 800, and/or auxiliary device 900.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components coupled to other components rather than included within parent components (hierarchical). Additionally, it is noted that one or more components may be combined into a single component providing aggregate functionality or divided into several separate sub-components, and any one or more middle layers may be provided to couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter can be appreciated with reference to the various figures. While for purposes of simplicity of explanation, the methodologies are described as a series of steps, it is to be understood and appreciated that the disclosed subject matter is not limited by the order of the steps, as some steps may occur in different orders and/or concurrently with other steps from what is described herein. Moreover, not all disclosed steps may be required to implement the methodologies described hereinafter.

While the various embodiments have been described in connection with the exemplary embodiments of the various figures, it is to be understood that other similar embodiments may be used or modifications and additions may be made to the described embodiment for performing the same function without deviating there from. Therefore, the present invention should not be limited to any single embodiment.

The invention claimed is:

1. An apparatus to facilitate dust collection comprising:
a chute configured to provide a dust seal between a bulk bag of material and a loading hatch of a silo, wherein the dust seal comprises a first seal between a first end of the chute and a bottom portion of the bulk bag, and wherein the dust seal further comprises a second seal between a second end of the chute and a top portion of the loading hatch; and
a vacuum hose coupled to a vent hole proximate to the loading hatch of the silo, wherein the vacuum hose is configured to apply a negative pressure at the vent hole, and wherein the negative pressure facilitates evacuating the airborne dust via the vacuum hose.

2. The apparatus of claim 1, wherein the chute is configured as a collapsible chute.

3. The apparatus of claim 2, wherein the chute includes a built-in spring tension configured to facilitate the dust seal by providing:
a first pressure at the first end of the chute; and
a second pressure at the second end of the chute.

4. The apparatus of claim 3, wherein the first pressure and the second pressure provided by the built-in spring tension are configured to maintain a vacuum within an interior portion of the silo in an area proximate to the loading hatch.

5. The apparatus of claim 1, wherein the material included in the bulk bag is un-hydrated cement, and wherein the dust seal is configured to prevent portions of the un-hydrated cement from escaping into an exterior portion of the chute.

6. The apparatus of claim 1, wherein the material included in the bulk bag is silica, and wherein the dust seal is configured to prevent portions of the silica from escaping into an exterior portion of the chute.

7. A method to facilitate dust collection comprising:
configuring a chute to provide a dust seal between a bulk bag of material and a loading hatch of a silo, wherein the configuring comprises:
forming a first seal between a first end of the chute and a bottom portion of the bulk bag;
forming a second seal between a second end of the chute and a top portion of the loading hatch;
coupling a vacuum hose to a vent hole proximate to the loading hatch of the silo; and
applying a negative pressure at the vent hole, wherein the negative pressure facilitates evacuating the airborne dust via the vacuum hose.

8. The method of claim 7, further comprising utilizing a collapsible chute as the chute.

9. The method of claim 8, further comprising utilizing a built-in spring tension of the collapsible chute to facilitate the dust seal by:
providing a first pressure at the first end of the chute; and
providing a second pressure at the second end of the chute.

10. The method of claim 9, further comprising configuring the first pressure and the second pressure provided by the built-in spring tension so as to maintain a vacuum within an interior portion of the silo in an area proximate to the loading hatch.

11. The method of claim 7, wherein the material included in the bulk bag is un-hydrated cement, and wherein the configuring comprises forming the dust seal so as to prevent portions of the un-hydrated cement from escaping into an exterior portion of the chute.

12. The method of claim 7, wherein the material included in the bulk bag is silica, and wherein the configuring comprises forming the dust seal so as to prevent portions of the silica from escaping into an exterior portion of the chute.

13. A method to facilitate dust collection comprising:
   extending a collapsible chute between a silo loading hatch and a discharge chute of a bulk bag, wherein the extending forms a dust seal between the silo loading hatch and the bulk bag;
   coupling a vacuum hose to a vent hole proximate to the silo loading hatch;
   releasing contents of the bulk bag via the discharge chute, wherein the contents of the bulk bag flow into the silo loading hatch, and wherein the dust seal prevents airborne dust associated with the flow from escaping into an exterior portion of the collapsible chute; and
   applying a negative pressure at the vent hole, wherein the negative pressure facilitates evacuating the airborne dust via the vacuum hose.

14. The method of claim 13, wherein the evacuating further comprises evacuating the airborne dust into a filter component.

15. The method of claim 14, wherein the filter component comprises a multi-stage filtration system.

16. The method of claim 15, wherein a first stage of the multi-stage filtration system is a cyclonic separation filter.

17. The method of claim 16, wherein a second stage of the multi-stage filtration system is a cartridge filter.

18. The method of claim 13, wherein the contents included in the bulk bag include un-hydrated cement, and wherein the extending comprises forming the dust seal so as to prevent portions of the un-hydrated cement from escaping into an exterior portion of the collapsible chute.

19. The method of claim 13, wherein the contents included in the bulk bag include silica, and wherein the extending comprises forming the dust seal so as to prevent portions of the silica from escaping into an exterior portion of the collapsible chute.

* * * * *